United States Patent [19]

Persson

[11] Patent Number: 5,002,405
[45] Date of Patent: Mar. 26, 1991

[54] BEARING WITH LUBRICATING STRIP
[75] Inventor: Stig Persson, Katrineholm, Sweden
[73] Assignee: SKF Mekanprodukter AB, Katrineholm, Sweden
[21] Appl. No.: 516,744
[22] Filed: Apr. 30, 1990
[30] Foreign Application Priority Data
Jun. 26, 1989 [SE] Sweden .................. 8902297
[51] Int. Cl.⁵ .................. F16C 33/66
[52] U.S. Cl. .................. 384/469
[58] Field of Search .......... 384/469, 568, 408, 170, 384/175, 383, 413

[56] References Cited
U.S. PATENT DOCUMENTS

| | | |
|---|---|---|
| 1,687,668 | 10/1928 | Himes . |
| 2,538,075 | 1/1951 | Armstrong . |
| 2,785,023 | 3/1957 | Naumann .................. 384/469 |
| 3,298,760 | 1/1967 | Linner et al. . |
| 3,514,168 | 5/1970 | Otto .................. 384/408 |
| 4,571,097 | 2/1986 | Lee et al. .................. 384/469 |

FOREIGN PATENT DOCUMENTS
1043841 9/1966 United Kingdom .

Primary Examiner—Lenard A. Footland
Attorney, Agent, or Firm—Burns, Doane, Swecker & Mathis

[57] ABSTRACT

A bearing is mounted in a bearing housing which contains lubricating oil. The bearing includes radially spaced outer and inner rings which confine bearing rollers therebetween. A radially outer surface of the outer ring contains a circular groove in which a strip of lubricant-conducting material is situated. A lower portion of the strip communicates with lubricant, whereby the strip conducts lubricant upwardly by capillary action to a radial passage formed through the outer ring at an upper location thereof. The lubricant gravitates through that passage to the space in which the bearing rollers are disposed. The radially outward facing side of the groove is closed-off by an inner surface of the housing to confine the lubricant within the groove.

15 Claims, 1 Drawing Sheet

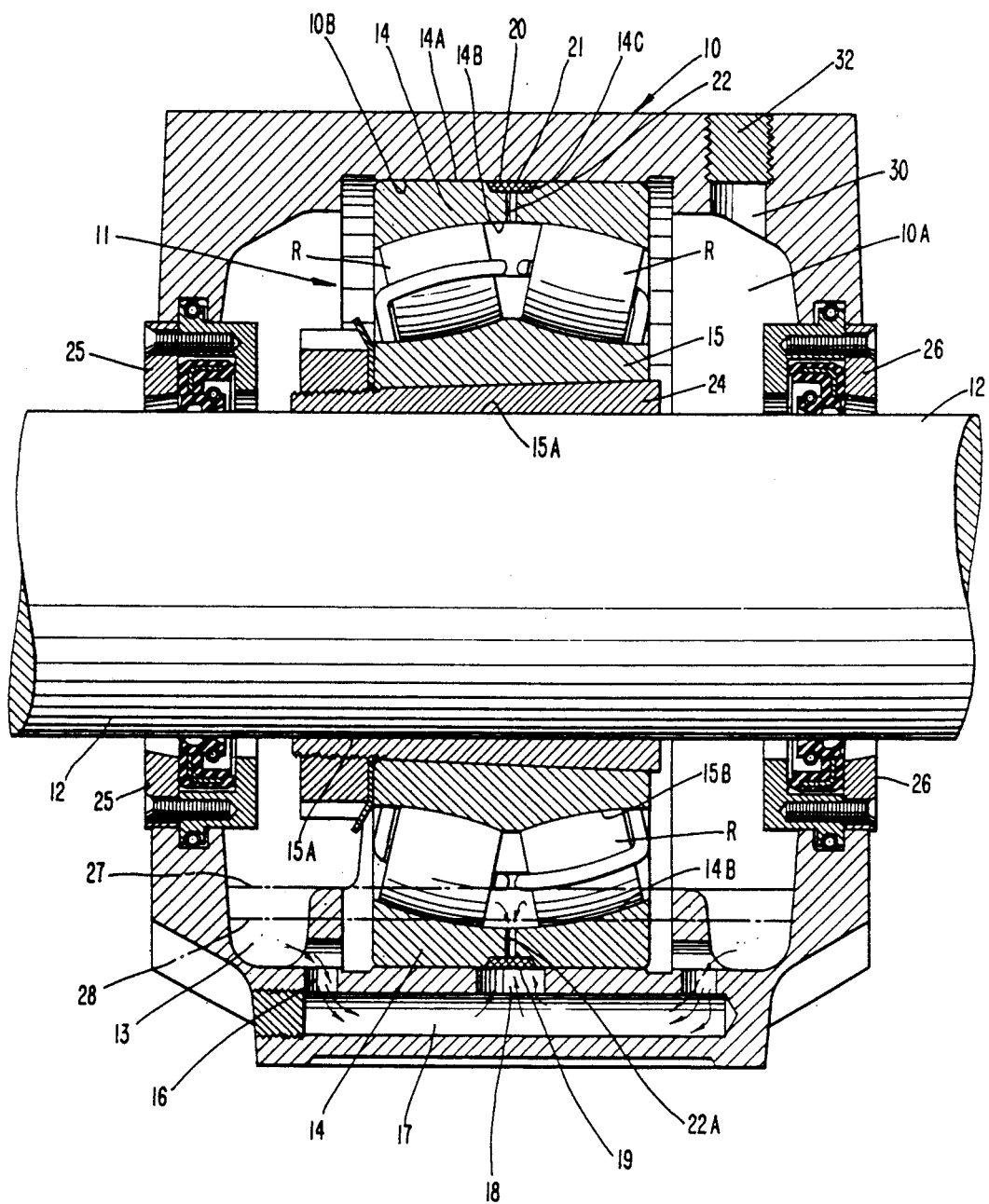

BEARING WITH LUBRICATING STRIP

BACKGROUND OF THE INVENTION

The present invention relates to bearings per se and to the combination of a bearing housing and a bearing, wherein the lubrication of the bearing is facilitated.

It is conventional to provide a bearing housing with a reservoir intended for containing lubricant oil and means adapted to transport the lubricant from the reservoir to the raceway of the outer ring of the bearing.

In arrangements of that type, the raceways of the bearing are usually lubricated by having lubricant flowing thereto by gravity. The amount of lubricant, then, must be large enough to ensure that the lubricant level is higher than the lowest point on the raceway of the outer ring over the whole width of the bearing. The amount of lubricant, thus, becomes comparatively large which causes a comparatively high operating temperature of the bearing, because a grater amount of lubricant is being squeezed or worked by the rotary elements of the bearing.

It is also previously known to supply lubricant to the bearing surface in a bearing by means of a felt strip by having a portion of the felt strip submerged in the lubricant and arranging the felt strip in direct connection with the bearing surface. However, this basic type of lubricating arrangement, which is shown in for instance U.S. Pat. No. 2,538,075 can be used only in friction bearings.

It is also known from U.S. Pat. No. 1,687,668 to mount the end of a rotary shaft within a bearing bushing and to provide grooving in the bushing which receives a wick. A lower end of the wick dips into a reservoir of lubricant so that the wick conducts the lubricant around the periphery of the bushing. Radial through holes formed in the grooving enable the lubricant to gravitate into the space between the bushing and rotary shaft. The wick is sized to project radially well beyond the open side of the groove in order to reach the lubricant. As a result, the distance which the lubricant must travel before reaching the through holes is greater. Also, the lubricant is not confined within the wick and thus may flow from the wick and onto the outer periphery of the bushing before reaching the through holes. Furthermore, the grooving does not extend in a circular path as viewed along the axis of the shaft, but rather extends in a rectangular or oval path. Consequently, the circumferential distance which the lubricant must travel before reaching the through holes is longer, and the lubricant may have to travel around corners which could inhibit the flow.

A main object of the present invention is to provide an arrangement for lubricating a rolling bearing mounted in a bearing housing, wherein the lubricant level can be kept low, thereby ensuring a lower operating temperature of the bearing.

SUMMARY OF THE INVENTION

The present invention relates to a bearing, per se and also to a bearing apparatus comprising the bearing and a housing in which the bearing is disposed. The housing comprises an internal surface which forms a cavity. The cavity defines a reservoir containing a supply of liquid lubricant. The bearing is disposed in the cavity and comprises an inner ring, an outer ring, and a plurality of rotary elements disposed radially therebetween. The inner and outer rings are coaxially arranged. The inner ring includes a radially outward facing annular raceway and a radially inward facing annular surface adapted to support the rotary member. The outer ring is spaced radially outwardly from the inner ring and includes a radially inward facing annular raceway and a radially outward facing annular surface which engages the cavity-defining surface of the cavity. The rotary elements rotatably bear against the raceways of the inner and outer rings. The outward facing annular surface of the outer ring includes a circumferential groove which is closed-off at its radially outer side by the internal surface of the cavity. The outer ring includes at least one through passage disposed adjacent an uppermost portion of the outer ring and extending from the groove to the radially inward facing raceway. A strip of lubricant-conductive material is disposed in the groove and extends from the through passage to a location below the level of the lubricant for conducting lubricant from the reservoir to the through passage for lubricating the rotary elements.

BRIEF DESCRIPTION OF THE DRAWING

The objects and advantages of the invention will become apparent from the following detailed description of a preferred embodiment thereof in connection with the accompanying drawing in which like numerals designate like elements.

The sole FIGURE is a longitudinal sectional view through a bearing housing and bearing according to the invention.

DETAILED DESCRIPTION OF A PREFERRED EMBODIMENT OF THE INVENTION

A rotary shaft 12 is journaled in a cavity 10A of a bearing housing 10 by means of a bearing 11. An inner ring 15 of the bearing 11 has a radially inward facing surface 15A which is secured in a conventional manner to the shaft 12 by means of a conical sleeve 24. An outer ring 14 of the bearing includes a radially outward facing surface 14A which is attached to an inner surface 10B of the bearing housing by press fit.

The outer and inner races 14, 15 are coaxially arranged and include radially inward and radially outward facing raceways 14A, 15B, respectively, for rotatably supporting therebetween a plurality of rotary elements such as rollers R. The cavity 10A of the housing 10 is provided with a lower pocket 13 which serves as a reservoir to accommodate lubricating oil for lubricating the bearing 11. On both axial sides of the bearing 11 there are provided conventional seals 25, 26 adapted to seal an opening of the bearing housing 10 against the shaft 12.

The surface 14A of the outer ring 14 is provided with a circumferential groove 14C in which a felt strip 20 is disposed. The groove 14C and strip 20 extend circularly around the entire circumference of the surface 14A and lie in a plane disposed perpendicularly relative to the common axis of the rings.

Passages 16, 17, 18 in the lower half of the bearing housing 10 connect the pocket 13 with a radially outer side 19 of the felt strip 20. The passages 16, 17, 18 communicate with the felt strip 20 below the level of the lubricant to ensure that the felt strip 20 is impregnated with lubricant. Preferably, the passage 18 is located in the vicinity of the lowest point on the outer ring 14.

The strip 20 can be made of any material having the ability to transport lubricant from a lower point to a higher point by capillary action. Lubricant is absorbed by the felt strip 20 when it comes into contact therewith and is then transported along the peripheral groove 14C in the outer ring 14 to a second higher position 21. In the illustrated embodiment, the position 21 is located at the highest point on the outer ring 14.

Lubricant can be added to the reservoir via a hole 30 in the housing 10 which is normally closed by a plug 32.

Disposed at the position 21 is a radial through passage 22 in the outer ring 14 which extends from the surface 14A to the raceway 14B of the outer ring 14. Advantageously, further radial through passages corresponding to the passage 22 can be provided at a plurality of peripherally spaced positions, including a radial passage 22A which is spaced circumferentially from the passage 22 by a distance equal to about one half the circumference of the outer ring 14 so as to be situated at the lowest point of the outer ring. The passage 22A is disposed below the level of lubricant oil and is thus able to conduct lubricant to a radially inward facing side of the strip 20.

In conventional arrangements for lubricating rolling bearings in bearing housings of the above-described type, the lubricant level has to exceed a certain minimum level 27 in order to ensure satisfactory lubricating of the bearing.

By means of the present invention it is possible to considerably lower the lubricant level, e.g., to the level denoted by 28, and still achieve satisfactory lubrication of the bearing 11. It has been found that it is possible to decrease the amount of lubricant by about half of that required in conventional designs, thereby considerably decreasing the temperature of the bearing, e.g., by about 10° C. Such a decreased temperature positively affects the life of the bearing It has also shown that the temperature variations in the bearing become lower which result in smaller variations of the bearing play.

Since the strip 20 is situated at the radially outermost surface 14A of the outer ring, it assuredly reaches the lowermost level of the reservoir lubricant and thus does not have to project radially beyond the groove in order to reach the lubricant. This means that the open side of the groove can be closed off by the surface 10B of the cavity 10A so as to confine the strip and lubricant within the groove.

Furthermore, by making the groove 14C extend in a circular path (as viewed along the axis of the shaft 12), the distance which the lubricant has to travel is minimized, and the lubricant does not have to traverse corners as is necessary in connection with the non-circular grooves, of the afore-mentioned U.S. Pat. No. 1,687,668.

The provision of the additional passage 22A in the outer ring 14 facilitates the travel of lubricant to the strip and also facilitates the positioning of the bearing in the housing In that regard, it will be appreciated that even if the bearing were rotated 180° from the depicted position, the passages 19, 19A would still be able to conduct lubricant to and from the strip. Hence, the bearing could be mounted in an inverted position relative to that depicted without adversely affecting its manner of operation.

The strip and groove are generally flat or rectangular as viewed in cross-section. The radially outward facing side of the strip could be arranged so as to lie flush with the surface 14A of the outer ring 14 prior to insertion of the bearing into the housing, thereby facilitating an axial insertion of the bearing into an axial opening in the bearing housing if that is how the bearing were to be introduced. In the depicted embodiment the housing 10 is in two halves whose parting plane coincides with the paper (only one housing half is depicted in the Figure). Thus, the bearing 11 would be inserted into the depicted housing half, and then the other housing half would be attached to the first housing half.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A bearing apparatus for supporting a rotary member, comprising:
    a housing having internal surface means forming a cavity, said cavity defining a reservoir containing a supply of liquid lubricant, and
    a bearing disposed in said cavity and comprising:
        an inner ring defining an axis and including a radially outward facing annular raceway and a radially inward facing annular surface adapted to support the rotary member,
        an outer ring arranged coaxially with and spaced radially outwardly from said inner ring, said outer ring including a radially inward facing annular raceway and a radially outward facing annular surface engaging said internal surface means of said housing,
        a plurality of rotary elements disposed radially between said inner and outer rings and rotatably bearing against said raceways thereof,
        said outward facing annular surface of said outer ring including a circumferential groove which is closed off at its radially outer side by said internal surface means of said housing,
        said outer ring including at least one through passage disposed within an upper half of said outer ring and extending from said groove to said radially inward facing raceway, and
        a strip of lubricant-conductive material disposed in said groove and extending from said passage to a location below a level of said liquid lubricant for conducting lubricant from said reservoir to said through passage for lubricating said rotary elements.

2. A bearing apparatus according to claim 1, wherein said housing includes a passage disposed below the level of lubricant for conducting lubricant to a radially outer side of said strip.

3. A bearing apparatus according to claim 2, wherein said outer ring includes an additional through passage disposed below the level of lubricant for conducting lubricant from said reservoir to a radially inner side of said strip.

4. A bearing apparatus according to claim 1, wherein said outer ring includes an additional through passage disposed below the level of lubricant for conducting lubricant from said reservoir to a radially inner side of said strip.

5. A bearing apparatus according to claim 1, wherein said groove and strip extend around the entire circumference of said outer ring.

6. A bearing apparatus according to claim 5, wherein said groove and strip extend circularly as viewed in a direction along an axis of said rotary member.

7. A bearing apparatus according to claim 1, wherein said groove and strip are generally flat as viewed in cross-section.

8. A bearing apparatus according to claim 1, wherein said strip comprises a felt material adapted to conduct liquid lubricant by capillary action.

9. A bearing adapted to be inserted in a liquid lubricant-containing bearing housing for rotatably supporting a rotary member, comprising:
   an inner ring defining an axis and including a radially outward facing annular raceway and a radially inward facing annular surface adapted to support a rotary member,
   an outer ring arranged coaxially with and spaced radially outwardly from said inner ring, said outer ring including a radially inward facing annular raceway and a radially outward facing annular surface adapted to engage an inner surface of a bearing housing,
   a plurality of rotary elements disposed radially between said inner and outer rings and rotatably bearing against said raceways thereof,
   said radially outward facing annular surface of said outer ring including a circumferential groove adapted to be closed off by an inner surface of a bearing housing, said groove extending around at least about one half of the circumference of said outer ring,
   said outer ring including at least one through passage extending from said groove to said radially inward facing raceway, and
   a strip of lubricant-conductive material disposed in said groove and extending circumferentially from said passage a distance of at least about one-half the circumference of said outer ring to be adapted for conducting liquid lubricant to said passage by capillary action.

10. A bearing according to claim 9, wherein said outer ring includes an additional through passage extending from said groove to said radially inward facing raceway at a location spaced circumferentially from said first-named passage by a distance of at least about one half the circumference of said outer ring.

11. A bearing apparatus according to claim 9, wherein said groove and strip extending around the entire circumference of said outer ring.

12. A bearing according to claim 11, wherein said groove and strip extend circularly as viewed in an axial direction.

13. A bearing according to claim 9, wherein said groove and strip are generally flat as viewed in cross-section.

14. A bearing according to claim 9, wherein said strip is formed of a felt material.

15. A bearing according to claim 9, wherein a radially outward facing side of said strip is substantially flush with said radially outward facing surface of said outer ring.

* * * * *